(12) United States Patent
Robert

(10) Patent No.: US 9,031,965 B2
(45) Date of Patent: May 12, 2015

(54) AUTOMATIC MANAGEMENT OF DIGITAL ARCHIVES, IN PARTICULAR OF AUDIO AND/OR VIDEO FILES

(75) Inventor: James C. Robert, Hatfield (GB)

(73) Assignee: S.I. SV. EL. S.p.A., Turin (IT)

( * ) Notice: Subject to any disclaimer, the term of this patent is extended or adjusted under 35 U.S.C. 154(b) by 515 days.

(21) Appl. No.: 12/374,337

(22) PCT Filed: Jul. 17, 2007

(86) PCT No.: PCT/IB2007/002010
§ 371 (c)(1),
(2), (4) Date: Oct. 19, 2009

(87) PCT Pub. No.: WO2008/012619
PCT Pub. Date: Jan. 31, 2008

(65) Prior Publication Data
US 2010/0049768 A1  Feb. 25, 2010

(30) Foreign Application Priority Data
Jul. 20, 2006 (IT) .............................. TO2006A0534

(51) Int. Cl.
*G06F 17/30* (2006.01)
(52) U.S. Cl.
CPC .... *G06F 17/30799* (2013.01); *G06F 17/30743* (2013.01); *G06F 17/30817* (2013.01); *G06F 17/30156* (2013.01)
(58) Field of Classification Search
USPC .......................................... 707/749, 758, 802
See application file for complete search history.

(56) References Cited

U.S. PATENT DOCUMENTS

| | | | | |
|---|---|---|---|---|
| 5,974,503 | A  * | 10/1999 | Venkatesh et al. | 711/114 |
| 6,070,160 | A  * | 5/2000 | Geary | 1/1 |
| 6,230,200 | B1 * | 5/2001 | Forecast et al. | 709/226 |
| 6,389,473 | B1 * | 5/2002 | Carmel et al. | 709/231 |
| 6,445,460 | B1 * | 9/2002 | Pavley | 358/1.15 |
| 6,473,756 | B1 * | 10/2002 | Ballard | 1/1 |
| 6,687,726 | B1 * | 2/2004 | Schneider | 708/625 |
| 6,990,628 | B1 * | 1/2006 | Palmer et al. | 715/234 |
| 7,062,158 | B1 * | 6/2006 | Ayaki | 386/248 |
| 7,225,249 | B1 * | 5/2007 | Barry et al. | 709/227 |
| 7,296,231 | B2 * | 11/2007 | Loui et al. | 715/723 |
| 7,552,474 | B2 * | 6/2009 | Gurda et al. | 726/22 |
| 7,680,853 | B2 * | 3/2010 | Yu et al. | 707/708 |
| 7,761,427 | B2 * | 7/2010 | Martin et al. | 707/661 |
| 7,930,301 | B2 * | 4/2011 | Marcjan et al. | 707/732 |

(Continued)

OTHER PUBLICATIONS

Later publication of International Search Report. May 8, 2008, (WO/2008/012619) Automatic Management of Digital Archives, In Particular of Audio and/or Video Files.

(Continued)

*Primary Examiner* — Hanh Thai
(74) *Attorney, Agent, or Firm* — Buchanan Nipper

(57) ABSTRACT

Methods are described for selecting and/or deleting files in a set of files, preferably relating to audio and/or video sequences. The present invention is based on the idea of finding substantially duplicate files, selecting the best one and deleting the others, this process being carried out in an automatic or quasi-automatic manner, i.e. with the user having to answer one or more confirmation requests. A certain number of duplicate files can be subjected to P logic blocks Ck (k being an integer, $1 \le k \le P$); each logic block makes a selection according to a choice criterion having higher priority than the next block.

34 Claims, 3 Drawing Sheets

(56) References Cited

U.S. PATENT DOCUMENTS

| | | | |
|---|---|---|---|
| 2001/0047290 A1* | 11/2001 | Petras et al. | 705/10 |
| 2002/0087383 A1* | 7/2002 | Cogger et al. | 705/10 |
| 2002/0169780 A1 | 11/2002 | Mraz | |
| 2003/0093790 A1* | 5/2003 | Logan et al. | 725/38 |
| 2004/0153457 A1* | 8/2004 | Fischer et al. | 707/10 |
| 2004/0243588 A1* | 12/2004 | Tanner et al. | 707/100 |
| 2005/0033757 A1* | 2/2005 | Greenblatt et al. | 707/100 |
| 2005/0060643 A1* | 3/2005 | Glass et al. | 715/501.1 |
| 2005/0104976 A1* | 5/2005 | Currans | 348/231.5 |
| 2005/0193335 A1* | 9/2005 | Dorai et al. | 715/530 |
| 2006/0085828 A1* | 4/2006 | Dureau et al. | 725/100 |
| 2006/0129768 A1* | 6/2006 | Pferdekaemper et al. | 711/161 |
| 2006/0136446 A1* | 6/2006 | Hughes et al. | 707/101 |
| 2006/0155704 A1* | 7/2006 | Fischer et al. | 707/8 |
| 2006/0218127 A1* | 9/2006 | Tate et al. | 707/3 |
| 2006/0242203 A1* | 10/2006 | Pferdekaemper et al. | 707/200 |
| 2007/0005581 A1* | 1/2007 | Arrouye et al. | 707/4 |
| 2007/0088690 A1* | 4/2007 | Wiggen et al. | 707/5 |
| 2007/0185848 A1* | 8/2007 | Farber et al. | 707/3 |
| 2007/0239949 A1* | 10/2007 | Childs et al. | 711/162 |
| 2007/0288715 A1* | 12/2007 | Boswell et al. | 711/164 |
| 2008/0065587 A1* | 3/2008 | Iwasaki et al. | 707/1 |
| 2008/0065707 A1* | 3/2008 | Iwasaki et al. | 707/205 |
| 2008/0066191 A1* | 3/2008 | Farber et al. | 726/28 |
| 2008/0071855 A1* | 3/2008 | Farber et al. | 709/201 |
| 2009/0234878 A1* | 9/2009 | Herz et al. | 707/102 |
| 2010/0299536 A1* | 11/2010 | Martin et al. | 713/189 |

OTHER PUBLICATIONS

Written Opinion of the ISA, Jan. 20, 2009, (WO/2008/012619) Automatic Management of Digital Archives, In Particular of Audio and/or Video Files.

International Preliminary Report on Patentability Chapter II, Jan. 20, 2009, (WO/2008/012619) Automatic Management of Digital Archives, In Particular of Audio and/or Video Files.

Piernas J et al: "Dualfs: A New Journaling File System Without Meta-Data Duplication" A Conference Proceedings of the 2002 International Conference on Supercomputing. ICS'02. New York, NY, Jun. 22-26, 2002, ACM International Conference on Supercomputing, New York, NY : ACM,US, . vol. CONF. 16, Jun. 22, 2002, pp. 137-146,XP001171510—ISBN: 1-58113-483-5.

* cited by examiner

AUTOMATIC MANAGEMENT OF DIGITAL ARCHIVES, IN PARTICULAR OF AUDIO AND/OR VIDEO FILES

TECHNICAL FIELD

The present invention relates to the automatic management of digital archives, in particular to the automatic management of archives of files relating to audio and/or video sequences.

BACKGROUND

The ever increasing spread of computer networks (especially the Internet), together with the availability of huge amounts of audio and video contents, has made it extremely easy and common to exchange audio and/or video contents among network nodes, in particular among users.

Of course, such a huge amount of data should be managed appropriately.

In a big digital archive, e.g. the file system stored on a hard disk of a personal computer, it may happen that there are several copies of the same file (in general having the same file name); it is also possible that there are several copies or several slightly different versions of the same audio and/or video sequence (in general having different file names). The user is often unaware of this situation; and even if he/she ever notices it, the user avoids "cleaning" the digital archive because it is a time-consuming and difficult task (especially for those audio and/or video sequences for which it is not possible to use the file name as a choice criterion in order to identify two identical or similar sequences).

Audio and/or video files often include descriptive data (also referred to as "metadata") which is added to the audio and/or video data in order to provide information about the files themselves, such as: title, duration, image resolution, compression and coding algorithms, quality, etc.

This data is used by electronic audio and/or video players for decoding the file correctly and for providing information about the audio and/or video sequence being played.

Software packages are available on the market which allow the user to search for files based on one or more descriptive features. The operating systems of the Microsoft Windows family include a tool that allows to search the file system for a file on the basis of the file name and/or of words contained in its text. Many e-mail programs have a function that allows to search the message archive for an e-mail message according to subject, date, sender, receiver, or words contained in its text. Even though these packages can help the user manage his/her digital archives, the management of great amounts of files is however burdensome for the user, and therefore it is practiced only to a small extent or not at all.

The general object of the present invention is to facilitate and improve the management of great amounts of files, in particular of files relating to audio and/or video sequences.

More specifically, the object of the present invention is to facilitate and improve the storage of great amounts of files, in particular of files relating to audio and/or video sequences.

Said objects are substantially achieved through selection and deletion methods having the functionalities set out in the appended method claims, which are intended as an integral part of the present description.

SUMMARY OF THE DISCLOSURE

The present invention is based on the idea of finding substantially duplicate files, selecting the best one and deleting the others, this process being carried out in an automatic or quasi-automatic manner, i.e. with the user having to answer one or more confirmation requests.

The methods according to the present invention are executed, for example, upon the user's request or whenever a new file is stored on the medium, or else at preset time intervals.

The method according to the present invention may provide for extracting a subset of parameters contained in the descriptive data of the audio-video files, and for calculating one or more significant values for each file depending on the criteria specified for choosing the file to be retained: best quality, best compromise between quality and occupied space, type of compression algorithm used, etc. These choice criteria can be set and configured by the user who, through a suitable interface, selects the criteria to be applied and the respective parameters, and then assigns a priority to each one of them.

The analysis of the extracted parameters and of the calculated significant values allows these criteria to be applied, and thus provides the automatic selection of a single file out of the set of duplicates, resulting in all other duplicates being eliminated or moved to another area of the medium.

According to a further aspect, the present invention also relates to an electronic apparatus adapted to implement said methods and having the features set out in the appended apparatus claims, which are intended as an integral part of the present description.

Further objects, features and advantages of the present invention will become apparent from the following detailed description.

BRIEF DESCRIPTION OF THE DRAWINGS

For a better understanding of the invention, some embodiments thereof will now be described by way of non-limiting examples with reference to the annexed drawings, wherein.

DETAILED DESCRIPTION

Figure 1:
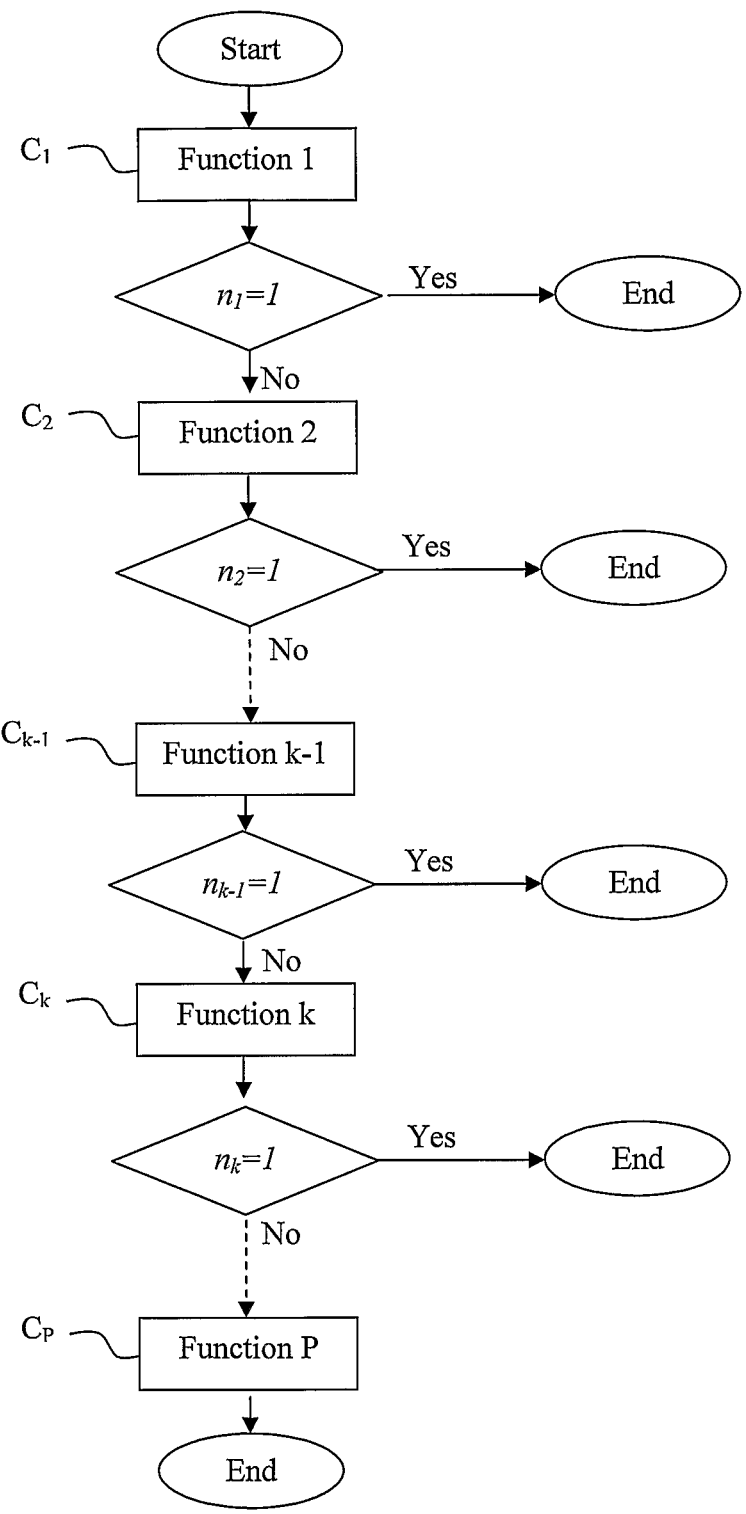
FIG. 1 is a general implementation chart of the method according to the invention.

FIG. 1 shows a general implementation chart of the method according to the invention.

Said method carries out a selection of one file in a subset of N files found to be duplicates of the same audio or video or audio-video sequence by using prior-art methods, or else specified as duplicates by the user.

The method consists in the sequential application, to the N duplicates, of different selection criteria according to a decreasing priority order.

In the chart of FIG. 1, N duplicates of the same audio-video sequence are subjected to P logic blocks $C_k$ (k being a whole number, $1 \leq k \leq P$); each logic block makes a selection according to a choice criterion having higher priority than the next block. Each logic block carries out a function which, for each file, analyses a subset of parameters or quantities derived therefrom by comparing such values with customizable thresholds or with one another.

If no file meets the requirements imposed by the function block, then the process will proceed to the next block.

If $n_k$ files meet the requirements imposed by function block $C_k$, then all other $n_{k-1} - n_k$ files will be removed.

Each block $C_k$ is immediately followed by a check of the number of duplicates $n_k$ remaining after the application of the function block. If $n_k=1$, then the file that meets the requirements best has been found, and the other $n_k-1$ files can be removed. If $n_{P-1}>1$ after the application of P-1 function blocks, then block P will make a random selection of one file among the remaining $n_{P-1}$ files, and all other $n_{P-1}-1$ files will be removed.

At the end of the chain, only one file of those belonging to the initial set of N duplicates will remain stored on the medium (i.e. $n_P=1$).

In an example of embodiment, the method according to the invention makes a selection of one file in a subset of N audio files found to be duplicates of the same audio sequence by using prior-art methods, or else specified as duplicates by the user.

Figure 2:
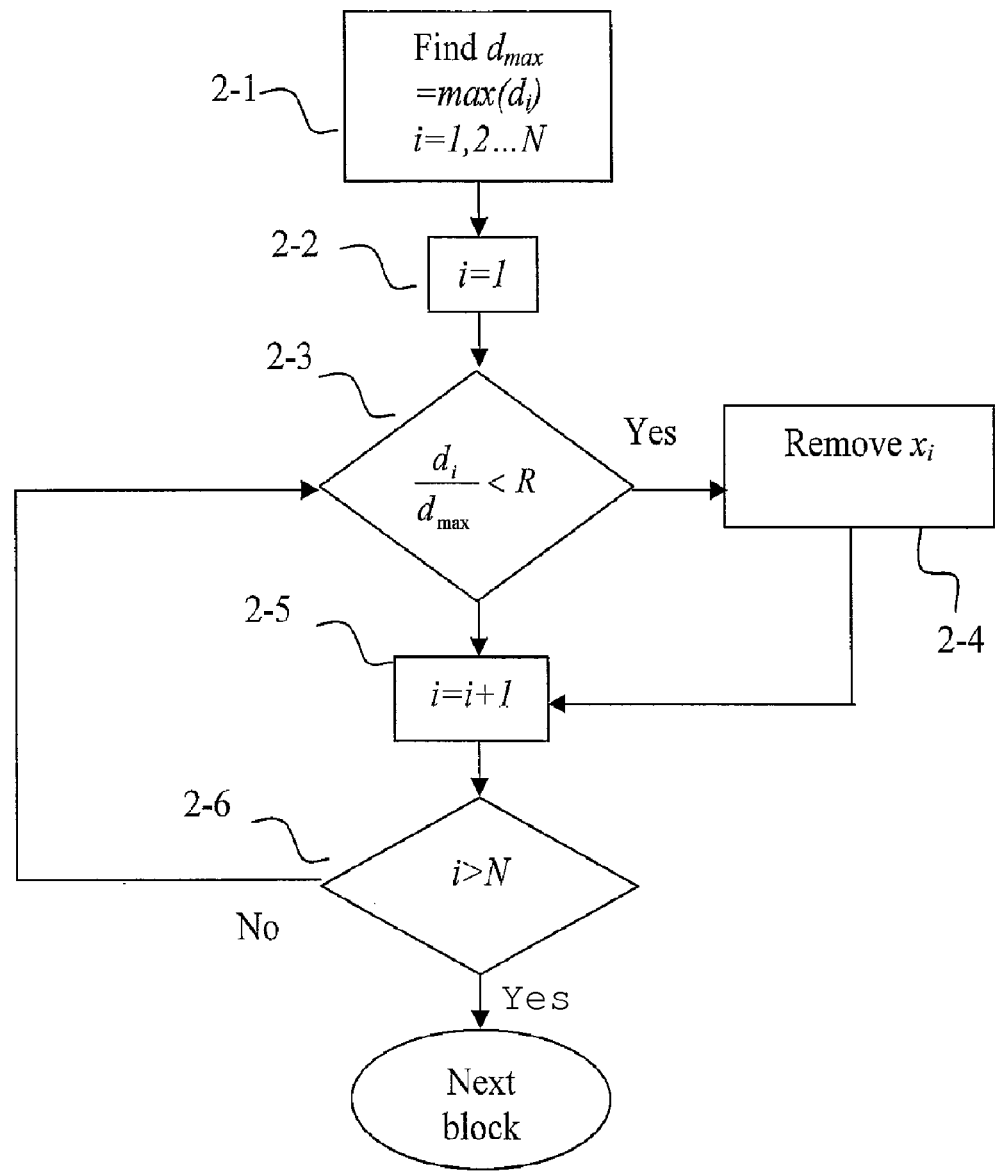
FIG. 2 is the flow chart of the function carried out by block $C_1$ in FIG. 1.

The flow chart of FIG. 2 shows a graphic representation of the function carried out by block $C_1$ in FIG. 1.

Block $C_1$ makes a selection among the N duplicate files based on sequence duration. The application of this criterion aims at removing incomplete duplicate files.

This function operates as follows: first, the longest audio sequence having the longest duration $d_{max}$ is found (2-1 in the chart). Then block 2-2 initializes the variable i=1; for each file $x_i$ having a duration $d_i$ (i being a whole number, $1 \le i \le N$) in the set of duplicates, the following value is calculated:

$$r_i = \frac{d_i}{d_{max}}$$

which is compared with a customizable value R, R being a real number, $0<R\le1$ (block 2-3 in the chart). The files $x_i$ with the parameter $r_i$ smaller than R are considered to be incomplete and are automatically removed (2-4). Block 2-5 increments said variable by one unit in order to analyze the next file. Check block 2-6 verifies if i>N; if yes, it means that all N files have been analyzed and the process can proceed to the next function; otherwise, the control will return to check block 2-3.

The selection thus carried out allows to reduce the number of duplicates from N to $n_1$, wherein $n_1 \le N$.

If $n_1=1$, the file to be retained has been selected and the process is complete.

Figure 3:
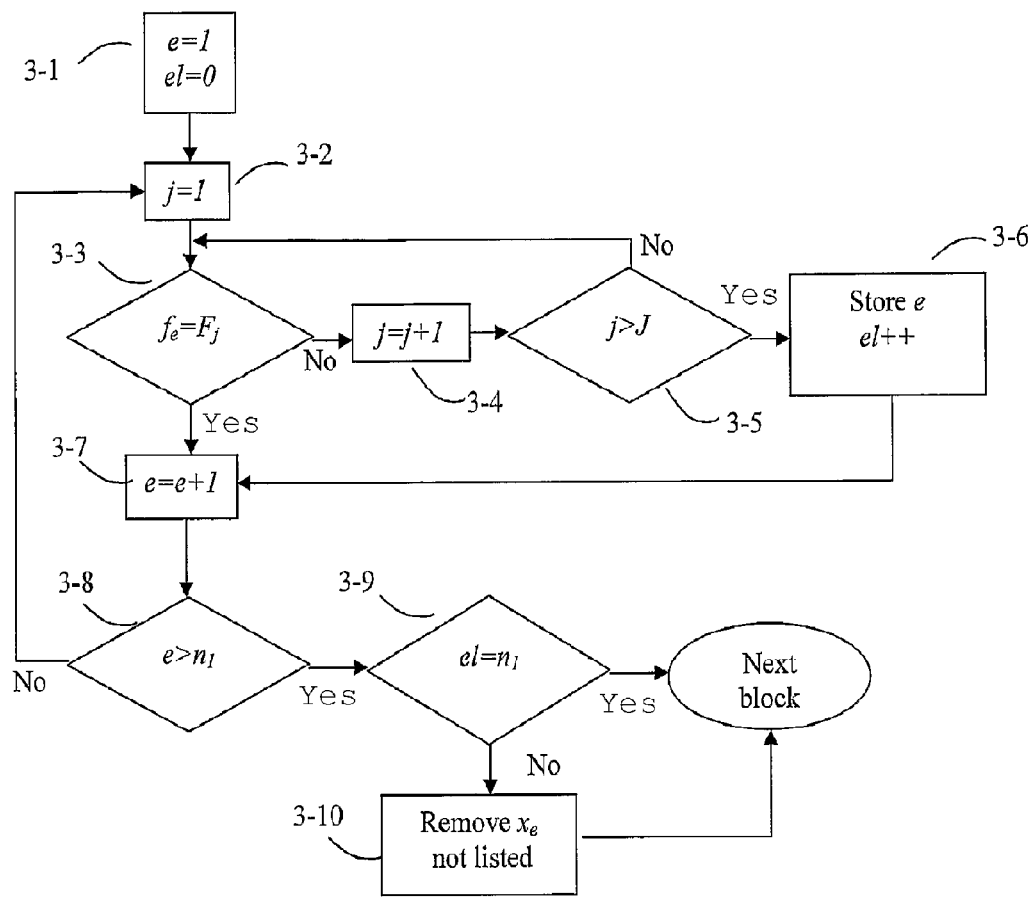
FIG. 3 is the flow chart of the function carried out by block $C_2$ in FIG. 2.

The flow chart of FIG. 3 shows a graphic representation of the function carried out by block $C_2$ in FIG. 1.

Block $C_2$ makes a selection among the $n_1$ duplicate files based on file format, i.e. depending on how the information is coded in order to be stored on the medium.

The format $f_e$ (wherein $1 \le e \le n_1$) of each file $x_e$ in the set of $n_1$ duplicates is compared with a list of J preferential formats $F_j$ (wherein $1 \le j \le J$) created by the user; all files $x_e$ in a format $f_e$ not included in said list will be automatically removed. In the event that none of the duplicate files falls within the preferential list, no file will be removed since it will be necessary to use another selection criterion having lower priority.

The selection thus carried out allows to reduce the number of duplicates from $n_1$ to $n_2$, wherein $n_2 \le n_1$.

If $n_2=1$, the file to be retained has been selected and the process is complete.

In FIG. 3, block 3-1 initializes the variable e to 1, and the variable el to 0; this latter variable represents the number of files to be removed. Block 3-2 initializes the variable j to 1. Check block 3-3 verifies if the format $f_e$ of the file $x_e$ coincides with the format $F_j$ in the list of preferential formats. If so, the variable e will be incremented by one unit (3-7). Otherwise, j will be incremented by one unit (3-4). Check block 3-5 then verifies that j>J. If so, the format $f_e$ is not included in the list and the index e will be stored in a memory location, at the same time incrementing el by one unit (block 3-6) before proceeding to block 3-7. Otherwise, the cycle will return to check block 3-3. Check block 3-8 verifies if $e>n_1$, i.e. if all initial $n_1$ files have been analyzed. If not, the cycle will start again from block 3-2. If yes, check block 3-9 will verify if $el=n_1$, i.e. if none of the initial files falls within the preferential list. If so, the cycle will proceed to the next block to apply another function. If some files fall within the list, then the other el files will be removed (3-10).

Block $C_3$ makes a selection among the $n_2$ duplicate files based on the quality of the audio sequence; this means that the best, worst or average file in terms of perceived quality (as desired by the user) will be retained.

The quality of an audio file can be estimated roughly by considering the following factors: algorithm used for data compression, sampling frequency (hereafter referred to as $f_s$, measured in Hz) and bit-rate (referred to as $BR_a$, measured in bit/s), i.e. the number of bits used for representing one second of audio sequence.

The first step compares $BR_a$ and $f_s$ with user-definable thresholds, which represent minimum and maximum levels of $BR_a$ and $f_s$. This comparison results in the removal of those duplicates having parameters outside the preset limits. In the event that no file complies with the imposed limits, no file will be removed and a quality estimation must be carried out.

If only one file among the $n_2$ duplicates is within the limits, the file to be retained has been selected and the process is complete.

The quality estimation of files which have not been removed during the above step can be obtained by calculating for each file the following value:

$$q_a = \frac{BR_a}{f_s}$$

The value of $q_a$ represents the mean number of binary digits used for representing a single audio sample.

When the compression algorithm used changes from file to file, the values $q_a$ of different files cannot be compared directly; it is in fact known that, $BR_a$ and $f_s$ being equal, different compression algorithms may lead to appreciably different qualitative levels.

It is then necessary to use a corrective factor $k_a$ and calculate:

$$Q_a = k_a * q_a$$

the value of the factor $k_a$ depends on the type of algorithm used, and must be obtained empirically based on psychoacoustic studies.

If the compression algorithm used is the same for all duplicate files, this step will not be required ($k_a=1$ for all files).

At this point, it will be necessary to find the maximum (or minimum, or mean, as desired by the user) value of $Q_a$ and retain all files associated with this value, while removing all other duplicates.

Files having the same $Q_a$ are considered to be equivalent.

The selection thus carried out allows to reduce the number of duplicates from $n_2$ to $n_3$, wherein $n_3 \le n_2$.

If $n_3=1$, the file to be retained has been selected and the process is complete.

Block $C_p$ makes a selection among the $n_{P-1}$ duplicates not yet removed by the previous blocks. All these files comply with the selection criteria set by the user. Since this is the last block, the selection criterion is not important, and it is possible to remove $n_{P-1}-1$ files randomly (e.g. the first $n_{P-1}-1$ files in alphabetical order), or the user may be asked to choose the files to be retained and those to be removed.

In another example of embodiment, the method according to the invention makes a selection of one file in a subset of video files found to be duplicates of the same video sequence by using prior-art methods, or else specified as duplicates by the user.

Blocks $C_1$ and $C_2$ remain the same, the only difference being that the parameters used (file duration and format) refer to the video sequence, not to the audio sequence. Block $C_P$ remains unchanged.

Function block $C_3$ makes a selection among $n_2$ duplicate files based on the quality of the video sequence; this means that the best (worst or average file as desired by the user) in terms of perceived quality will be retained.

The quality of a video file can be estimated roughly by considering the following factors: algorithm used for data compression, frame refresh frequency (hereafter referred to as $f_r$, measured in frame/s), bit-rate (referred to as $BR_v$, measured in bit/s), i.e. the number of bits used for representing one second of video sequence, and video resolution (referred to as ris, measured in pixel/frame).

The first step compares $BR_v$, $f_r$ and ris with user-definable thresholds: this represents minimum and maximum levels of $BR_v$, $f_r$ and ris. This comparison results in the removal of those duplicates having parameters outside the preset limits. In the event that no file complies with the imposed limits, no file will be removed and a quality estimation must be carried out.

If only one file among the $n_2$ duplicates is within the limits, the file to be retained has been selected and the process is complete.

The quality estimation of files which have not been removed during the above step can be obtained by calculating for each file the following value:

$$q_v = \frac{BR_v}{f_r \times ris}$$

This value represents the mean number of binary digits used for representing a single video sample, i.e. one pixel in a frame.

When the compression algorithm used changes from file to file, the values $q_v$ of different files cannot be compared directly; it is in fact known that, $BR_v$, $f_r$, and ris being equal, different compression algorithms may lead to appreciably different qualitative levels.

It is then necessary to use a corrective factor $k_v$ and calculate:

$$Q_v = k_v * q_v$$

wherein $k_v$ is a factor depending on the type of algorithm used, and must be obtained empirically based on psycho-visual studies.

If the compression algorithm used is the same for all duplicate files, this step will not be required ($k_v=1$ for all files).

At this point, it will be necessary to find the maximum (or minimum, or mean, as desired by the user) value of $Q_v$ and retain all files associated with this value, while removing all other duplicates.

Files having the same $Q_v$ are considered to be equivalent.

The selection thus carried out allows to reduce the number of duplicates from $n_2$ to $n_3$, wherein $n_3 \leq n_2$.

If $n_3=1$, the file to be retained has been selected and the process is complete.

In another example of embodiment, the method according to the invention makes a selection of one file in a subset of N files found to be duplicates of the same sequence comprising both video and audio by using prior-art methods, or else specified as duplicates by the user.

Blocks $C_1$ and $C_2$ remain the same, the only difference being that the parameters used (file duration and format) refer to the video-audio sequence, not to the audio sequence. Block $C_P$ remains unchanged.

Block $C_3$ evaluates the quality of the audio and video streams separately according to the above-described methods, and the file to be retained is chosen on the basis of either stream as desired by the user.

In another example of embodiment, the audio-video file to be retained is chosen by calculating for each duplicate the following parameter:

$$Q_{va} = Q_v * Q_a$$

which takes into account the video and audio quality starting from the values of $Q_a$ associated with the audio stream and of $Q_v$ associated with the video stream.

It is therefore possible to find the maximum (or minimum, or mean, as desired by the user) value of $Q_{va}$ and retain all files associated with this value, while removing all other duplicates.

Files having the same $Q_{va}$ are considered to be equivalent.

The selection thus carried out allows to reduce the number of duplicates from $n_2$ to $n_3$, wherein $n_3 \leq n_2$.

If $n_3=1$, the file to be retained has been selected and the process is complete.

Sometimes, files representing audio and/or video works are accompanied by additional data describing the license granted for using said works by specifying what is allowed and what is forbidden, thus limiting the use of said works (digital rights management).

Block $C_4$ (not shown in FIG. 1) makes a selection based on the user license associated with each file included in the set of duplicates. This selection aims at retaining the files having less restrictive terms of use. This means that those files will be retained which:

allow the highest number of sequence play events,
have the latest expiry date,
allow to make the highest number of copies,
allow to play the sequence on the highest number of devices, each of the above criteria having a priority level assigned by the user through a suitable interface.

In a variant of the invention, the order of the function blocks changes according to the priority assigned to each selection criterion by the user. For example, if the user assigns a higher priority level to file quality than file format, block $C_2$ must precede $C_3$ in the chain.

In another variant of the invention, the file to be retained is proposed to the user, whom is then requested to confirm the choice before the duplicates are actually removed; the selection of the file to be retained is still automatic, but it is guided or conditioned by the user, who only has to give his/her final approval.

In other words, the various function blocks make a selection without deleting the file from the medium and propose said selection to the user: in this manner, the user can keep control of the process.

As aforesaid, the selection and/or deletion methods according to the present invention can advantageously be implemented and/or integrated in an electronic apparatus, e.g. in a program executed in the apparatus.

Typical apparatuses whereto the deletion method according to the present invention may be applied are, for example, audio and/or video reproduction devices such as the so-called "MP3 players" with semiconductor memory; in these portable devices, the memory available for storing sequences is rather limited (though it is constantly growing—nowadays it holds about 1 Gbyte), and it is therefore important to avoid keeping several copies of the same sequence.

In devices like those mentioned above, it is very advantageous that the deletion method is executed in an essentially automatic manner, so that the user is not bothered or required to do anything.

The device may execute repetitively a cycle for finding duplicates, possibly followed by the deletion thereof, preferably at regular time intervals. Such a solution may become very burdensome (from a data processing viewpoint), especially when applied to a large number of files; in such a case, it may be provided that the duplicate file deletion cycle is only executed upon a user's command.

Alternatively or additionally, it is very effective and efficient to carry out a verification every time a new file is stored in the device; in other words, when a new file is stored in the device, the device will search the old, previously stored files for a file being a duplicate of the new one; if such a file is found, the device will automatically or semi-automatically decide which one to retain and which one to delete.

The above-described embodiments of the present invention are merely exemplificative; the principles of the present invention may find application in other embodiments as well.

The scope and extent of the present invention are therefore determined by the appended claims.

What is claimed is:

1. A method for managing digital archives on an electronic apparatus having a non-transitory digital data storage medium storing a plurality of files, said method comprising the steps of:
   finding a set of files from said plurality of files, said set of files having at least one similar or identical datum;
   setting a plurality of file selection criteria;
   defining a priority order of said plurality of file selection criteria based on priority, from a highest priority decreasing to a lowest priority;
   selecting the highest priority file selection criterion according to said priority order;
   iteratively performing the following steps (a) through (d) until either (1) all file selection criteria have been applied, or (2) there is only one file in said set of files:
   (a) applying said selected file selection criterion to each file in said set of files,
   (b) determining a number of files which meet the requirements of said selected file selection criterion,
   (c) if said number of files which meet the requirements of said selected file selection criterion is greater than one, removing from said set of files all files in said set of files which do not meet the requirements of said selected file selection criterion, and
   (d) selecting the next lower priority file selection criteria according to said priority order; and
   selecting the file(s) which remain in said set of files.

2. The method of claim 1, wherein at least one file selection criterion is predetermined, or is selected by a user among a predetermined set of file selection criteria.

3. The method of claim 2, wherein said user can replace or modify said predetermined file selection criterion.

4. The method of claim 1, wherein said plurality of file selection criteria is predetermined, or is selected by a user among a predetermined set of file selection criteria.

5. The method of claim 4, wherein said user can change said predetermined plurality of file selection criteria.

6. The method of claim 1, wherein said order is predetermined, or said order is selected by a user.

7. The method of claim 6, wherein said user can change said predetermined order.

8. The method of claim 1, wherein the set of files comprises different subsets of files, and wherein the file selection criterion of said plurality of file selection criteria are applied to said subsets of files.

9. The method of claim 8, wherein the file selection criterion of said plurality of file selection criteria are applied to gradually smaller subsets of files.

10. The method of claim 1, wherein each file in said set of files has a file coding format, and wherein at least one file selection criterion is related to the file coding format.

11. The method of claim 10, wherein said at least one file selection criterion provides for comparing the file coding format with a preset or user-defined list of coding formats.

12. The method of claim 1, wherein each file in said set of files contains an audio sequence and/or a video sequence, wherein at least one file selection criterion is related to the duration of the audio sequence and/or said video sequence.

13. The method of claim 12, wherein said at least one file selection criterion related to duration is applied to a group of files corresponding to said set of files, or said file selection criterion related to duration is applied to a subset of said set of files, and said method further comprises the following sequential steps:
   searching said group of files for the file having the longest duration,
   for each file in said group of files, calculating the ratio between file duration and the duration of the file having said longest duration, and
   selecting those files in said group for which said ratio is higher than a preset or user-defined value.

14. The method of claim 1, wherein each file in said set of files contains an audio sequence, wherein said at least one file selection criterion is related to comparing the sampling frequency of the audio signal and/or bit-rate of the file with at least one preset or user-defined threshold.

15. The method of claim 1, wherein each file in said set of files contains a video sequence, wherein said at least one file selection criterion is related to comparing the frame frequency of the video signal and/or bit-rate and/or video resolution of the file with at least one preset or user-defined threshold.

16. The method of claim 1, wherein at least one file selection criterion is related to file quality.

17. The method of claim 16, wherein said at least one file selection criterion related to quality is applied to a group of files corresponding to said set of files, or said at least one file selection criterion related to quality is applied to a subset of said set of files, and said method further comprises the following sequential steps:
   for each file of said group, calculating a quality estimation parameter, and
   selecting those files in said group for which the calculated parameter meets a preset or user-defined condition.

18. The method of claim 17, wherein said selected file(s) contains an audio sequence, and wherein said estimation parameter is obtained by calculating the number of bits used for representing the audio sequence.

19. The method of claim 18, wherein said estimation parameter is obtained by multiplying said number of bits by a factor being a function of a compression algorithm adopted for coding the corresponding audio sequence.

20. The method of claim 17, wherein said selected file(s) contains a video sequence, wherein said estimation parameter is obtained by calculating the number of bits used for representing the video sequence.

21. The method of claim 20, wherein said estimation parameter is obtained by multiplying said number of bits by a factor being a function of a compression algorithm adopted for coding the corresponding video sequence.

22. The method of claim 1, wherein at least one file selection criterion provides for the random selection of a single file.

23. The method of claim 1, wherein said file has a file user license, and wherein said at least one file selection criterion is related to at least one datum relating to the file user license, in particular to extent of use, license expiry date and number of copies allowed.

24. A method for managing digital archives on an electronic apparatus having a digital data storage medium storing a plurality of files, said method comprising the steps of:

finding a set of files from said plurality of files, said set of files having at least one similar or identical descriptive datum;
   selecting a plurality of file selection criteria;
   defining a priority order of said plurality of file selection criteria based on priority, from a highest priority decreasing to a lowest priority;
   selecting the highest priority file selection criterion according to said priority order;
   iteratively performing the following steps (a) through (d) until either (1) all file selection criteria have been applied, or (2) there is only one file in said set of files:
   (a) applying said selected file selection criterion to each file in said set of files,
   (b) determining a number of files which meet the requirements of said file selected selection criterion,
   (c) if said number of files which meet the requirements of said file selection criterion is greater than one, removing from said set of files all files in said set of files which do not meet the requirements of said selected file selection criterion, and
   (d) selecting the next lower priority file selection criteria according to said priority order; and
   deleting from said digital data storage medium all files in said found set of files except the file(s) which remain in said set of files.

25. The method of claim 24, further comprising the steps of:
   selecting a single file from said files which remain in said set of files, and
   deleting all files from said files which remain except said single file.

26. The method of claim 24, wherein the finding a set of files from said plurality of files step is executed automatically.

27. The method of claim 24, wherein the finding a set of files from said plurality of files step is executed with the help of a user.

28. The method of claim 24, wherein the deleting from said digital data storage medium all files step is only executed after one or more confirmations by a user.

29. The method of claim 28, wherein the user is asked to make at least one confirmation for each file to be deleted.

30. The method of claim 24, wherein said electronic apparatus is a portable device only adapted to play audio and/or video sequences.

31. The method of claim 24, wherein said electronic apparatus comprises means adapted to execute said deletion method upon a user's request.

32. The method of claim 24, wherein said electronic apparatus comprises means adapted to execute said deletion method automatically.

33. The method of claim 24, wherein said electronic apparatus comprises means adapted to execute said deletion method repetitively, preferably at regular time intervals.

34. The method of claim 24, wherein said electronic apparatus comprises means adapted to execute said deletion method every time a new file is stored on said storage medium.

* * * * *